US008074259B1

(12) United States Patent  (10) Patent No.: US 8,074,259 B1
Levy et al.  (45) Date of Patent: Dec. 6, 2011

(54) AUTHENTICATION MARK-UP DATA OF MULTIPLE LOCAL AREA NETWORKS

(75) Inventors: Joseph H. Levy, Eagle Mountain, UT (US); Shannon L. Johnson, Citrus Heights, CA (US); David M. Telehowski, San Jose, CA (US); Zhong Chen, Fremont, CA (US)

(73) Assignee: SonicWall, Inc., San Jose, CA (US)

( * ) Notice: Subject to any disclaimer, the term of this patent is extended or adjusted under 35 U.S.C. 154(b) by 1252 days.

(21) Appl. No.: 11/118,506

(22) Filed: Apr. 28, 2005

(51) Int. Cl.
*G06F 7/04* (2006.01)
(52) U.S. Cl. .......................................................... 726/2
(58) Field of Classification Search .................. 726/2, 4; 713/153
See application file for complete search history.

(56) References Cited

U.S. PATENT DOCUMENTS

| 6,636,894 | B1 * | 10/2003 | Short et al. ..................... 709/225 |
| 6,789,110 | B1 * | 9/2004 | Short et al. ..................... 709/221 |
| 6,839,842 | B1 | 1/2005 | Iverson et al. |
| 6,847,995 | B1 | 1/2005 | Hubbard et al. |
| 6,851,051 | B1 | 2/2005 | Bolle et al. |
| 6,857,073 | B2 | 2/2005 | French et al. |
| 2002/0021665 | A1 * | 2/2002 | Bhagavath et al. ............. 370/229 |
| 2002/0066033 | A1 * | 5/2002 | Dobbins et al. ................ 713/201 |
| 2005/0027837 | A1 | 2/2005 | Roese et al. |
| 2006/0264201 | A1 * | 11/2006 | Zhang ............................ 455/411 |

OTHER PUBLICATIONS

B. Anton (Gemtek Systems, Inc.), B. Bullock (iPass, Inc.), J. Short (Nomadix, Inc.), Titled: "Best Current Practices for Wireless Internet Service Provider (WISP) Roaming", Feb. 2003, pp. 1-37.
Jeff Edgett & Roy Albert (iPass Inc.), Titled: "Generic Interface Specification White Paper", 2003, pp. 1-9, www.ipass.com.

* cited by examiner

*Primary Examiner* — Ellen Tran
(74) *Attorney, Agent, or Firm* — Blakely, Sokoloff, Taylor & Zafman, LLP

(57) ABSTRACT

An authentication mark-up data of multiple local area networks is disclosed. In one embodiment of a system, the system includes a wide area network, an update device coupled to the wide area network, and any number of gateway devices coupled to the wide area network. Each of the gateway devices is associated with a separate local area network. Each of the plurality of gateway devices automatically provide an authentication page stored in the update device based upon a data provided to the update device. In addition, the authentication page is the same for at least some of the plurality of gateway devices, according to the one embodiment.

24 Claims, 17 Drawing Sheets

400

```
┌─────────────────────────────────────┐
│ Generate authentication data (e.g., │
│ markup data using markup language   │
│ such as HTML or XML) to be used in  │
│ one or more authentication pages    │
│ (e.g., Web pages)                   │
│ 402                                 │
└─────────────────────────────────────┘
                  │
                  ▼
┌─────────────────────────────────────┐
│ Determine which portion of the      │
│ authentication data is associated   │
│ with which of multiple network      │
│ access devices (e.g., gateway) of   │
│ multiple networks (e.g., LANs)      │
│ 404                                 │
└─────────────────────────────────────┘
                  │
                  ▼
┌─────────────────────────────────────┐
│ Associate the determine portions of │
│ the authentication data to each of  │
│ the network access devices, where   │
│ at least a portion of the           │
│ authentication data are shared      │
│ among at least two network access   │
│ devices                             │
│ 406                                 │
└─────────────────────────────────────┘
                  │
                  ▼
┌─────────────────────────────────────┐
│ Store the associated authentication │
│ data in an update device (e.g., a   │
│ dedicated server)                   │
│ 408                                 │
└─────────────────────────────────────┘
```

A network access device (e.g., gateway) receives a request over a first network (e.g., LAN) from a client for accessing a destination, where the network access device interfaces the first network with a second network (e.g., WAN)
501

↓

In response to the request, the network access device redirects the request to a page (e.g., Web page) of an update device (e.g., a dedicated server) over the second network, where the page of the update device is constructed using at least a portion of authentication data (e.g., markup data) shared with other network access devices of other networks
502

↓

An authentication facility (e.g., AAA server) is invoked to authenticate the client via the authentication page and returns a response back to the network access device based on a result of the authentication
503

↓

In response to the response received from the authentication facility, the network access device forwards the received response to the client over the first network
504

↓

Optionally, the network access device presents a page representing the authentication result to the client (e.g., a retry message when the authentication service is unavailable and/or a timeout is reached)
505

FIG. 5

```
<?xml version="1.0" encoding="UTF-8">
<SonicWALLAccessGatewayParam
    xmlns:xsi="http://www.w3.org/2001/XMLSchema-instance"
    xsi:noNamespaceSchemaLocation="http://www.sonicwall.com/
    SonicWALLAccessGatewayParam.xsd">
    <AuthenticationReply>
        <ResponseCode>{response code}</ResponseCode>
        <ReplyMessage>{reply message}</ReplyMessage>
    </AuthenticationReply>
</SonicWALLAccessGatewayParam>
```

FIG. 10A

```
<?xml version="1.0" encoding="UTF-8">
<SonicWALLAccessGatewayParam
    xmlns:xsi="http://www.w3.org/2001/XMLSchema-instance"
    xsi:noNamespaceSchemaLocation="http://www.sonicwall.com/
    SonicWALLAccessGatewayParam.xsd">
    <LogoffReply>
        <ResponseCode>{response code}</ResponseCode>
        <ReplyMessage>{reply message}</ReplyMessage>
    </LogoffReply>
</SonicWALLAccessGatewayParam>
```

FIG. 10B

```
<?xml version="1.0" encoding="UTF-8">
<SonicWALLAccessGatewayParam
    xmlns:xsi="http://www.w3.org/2001/XMLSchema-instance"
    xsi:noNamespaceSchemaLocation="http://www.sonicwall.com/
    SonicWALLAccessGatewayParam.xsd">
    <ServerStatus>{status code}</ServerStatus >
</SonicWALLAccessGatewayParam>
```

FIG. 10C

```
<?xml version="1.0" encoding="UTF-8">
<SonicWALLAccessGatewayParam
    xmlns:xsi="http://www.w3.org/2001/XMLSchema-instance"
    xsi:noNamespaceSchemaLocation="http://www.sonicwall.com/
    SonicWALLAccessGatewayParam.xsd">
    <SessionSync>
        <baseMgmtUrl>[https://ip.add.re.ss:port]</baseMgmtUrl>
        <clientRedirectUrl>
http://ip.add.re.ss:port]</clientRedirectUrl>
        <SessionCount>{Session Count}</SessionCount>
        <SessionList>
            <Session>
                <ID>{Session ID}</ID>
                <UserName>{User Name}</UserName>
                <IP>{IP Address}</IP>
                <MAC>{MAC Address}</MAC>
                <Idle>
                    {Time Idle (expressed in seconds)}
                </Idle>
                <SessionRemaining>
                    {Session Remaining (expressed in seconds)}
                <Session Remaining>
            </Session>
        </SessionList>
    </SessionSync>
</SonicWALLAccessGatewayParam>
```

FIG. 10D

```
<?xml version="1.0" encoding="UTF-8">
<SonicWALLAccessGatewayParam
    xmlns:xsi="http://www.w3.org/2001/XMLSchema-instance"
    xsi:noNamespaceSchemaLocation="http://www.sonicwall.com/
    SonicWALLAccessGatewayParam.xsd">
    <SessionSync>
        <ResponseCode>{response code}</ResponseCode>
    </SessionSync>
</SonicWALLAccessGatewayParam>
```

FIG. 10E

```
<?xml version="1.0" encoding="UTF-8">
<SonicWALLAccessGatewayParam
    xmlns:xsi="http://www.w3.org/2001/XMLSchema-instance"
    xsi:noNamespaceSchemaLocation="http://www.sonicwall.com/
    SonicWALLAccessGatewayParam.xsd">
    <AccountCreationReply>
        <ResponseCode>{response code}</ResponseCode>
        <ReplyMessage>{reply message}</ReplyMessage>
    </AccountCreationReply>
</SonicWALLAccessGatewayParam>
```

AUTHENTICATION MARK-UP DATA OF MULTIPLE LOCAL AREA NETWORKS

COPYRIGHT NOTICES

A portion of the disclosure of this patent document may contain material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

The present disclosure relates to network communications. More particularly, this application relates to authentication mark-up data of multiple network access devices.

BACKGROUND

Improvements in communication technology have enabled coffee shops, restaurants, and other retail establishments to offer network connectivity to patrons (e.g., access to an Internet). Furthermore, some large chain retail establishments (e.g., such as Starbucks®, McDonalds®, and others) have enabled each of their retail locations with wired and wireless network connectivity for patrons (e.g., through "hot spots" created using a gateway device such as an access point device, and/or through a physical Ethernet port).

In one scenario, a patron wishing to access the Internet wirelessly through a laptop may enter a coffee shop offering wireless Internet service. After detecting a presence of a gateway device (e.g., a nearby access point device, and/or a nearby security device), the laptop may indicate the strength of an available wireless connection, and may redirect a browser on the laptop to an authentication page (e.g., and/or authentication file) physically stored within a memory on the gateway device.

The authentication page or pages may be generated using a mark-up language data such as, for example, HTML (hyper-text markup language), requiring the patron to enter authentication information (e.g., a user name, a password, credit card information, etc.). Before the patron is permitted to access the Internet (e.g., and/or other network), the authentication page may require validation (e.g., through a Remote Authentication Dial-In User Service (RADIUS) server) to ensure that the patron has paid the required fee and/or is permitted access to restricted content (e.g., it should be noted that the authentication page may require validation for both wired and wirelessly associated patrons). The authentication page may also include marketing information (e.g., such as promotions, specials, announcements, coffee specials, coupons, weather, etc.).

When a coffee shop headquarters has new marketing information for patrons using network connectivity, the coffee shop headquarters may instruct each of their retail locations to manually replace the authentication page on each gateway device within each retail location. For example, this may require each retail location of the coffee shop to temporarily disrupt network service and reconfigure the gateway device with a new authentication page. If a particular retail location of the coffee shop forgets to update to the new authentication page, outdated information may be displayed to patrons resulting in a less than perfect patron experience (e.g., loss of marketing opportunity, patron confusion, misrepresentation, etc.). In addition, replacing authentication pages at each retail location when the new marketing information is made public is expensive and cumbersome because skilled employee time is required to replace old authentication pages.

SUMMARY

Authentication mark-up data of multiple local area networks (LANS) is disclosed. In one aspect, a system includes a wide area network, an update device coupled to the wide area network, and any number of gateway devices coupled to the wide area network. Each of the gateway devices is associated with a separate local area network. Each of the gateway devices automatically provides an authentication page stored in the update device based upon a data provided to the update device. In addition, the authentication pages may be generated using at least a portion of the authentication markup data that are shared among some of the authentication pages, according to the one embodiment.

In another aspect, an update device includes a processing unit coupled to a memory through a bus; and a process executed from memory by the processing unit to cause the processing unit to process authentication mark-up data from an administrator; and communicate the authentication mark-up data to multiple local area networks (LANs) to provide an authentication page associated with each one of the LANs. There may be any number of authentication pages stored in the update device. Each of the authentication pages is associated with at least two different local area networks. Furthermore, at least some of the authentication pages may be based on data associated with the local area networks, gateway devices, and/or other criteria.

Other features of various embodiments will be apparent from the accompanying drawings and from the detailed description that follows.

BRIEF DESCRIPTION OF THE DRAWINGS

Various embodiments are illustrated by way of example and not limitation in the figures of the accompanying drawings, in which like references indicate similar elements and in which:

FIG. 4 is a process flow diagram of generating and associating the master authentication mark-up data across multiple local area networks, according to one embodiment.

FIG. 5 is a process flow diagram of redirecting a user associated with the gateway device to the update device, according to one embodiment.

FIGS. 10A-10F are examples of message formats in XML according to certain embodiments.

DETAILED DESCRIPTION

Methods and apparatuses for enabling authentication mark-up data to be shared among multiple local area networks (LANs) are described herein. In the following description, numerous specific details are set forth. However, it is understood that embodiments may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment is included in at least one embodiment. The appearances of the phrase "according to one embodiment", "may", and "can" in various places in the specification do not necessarily all refer to the same embodiment.

Figure 1A:
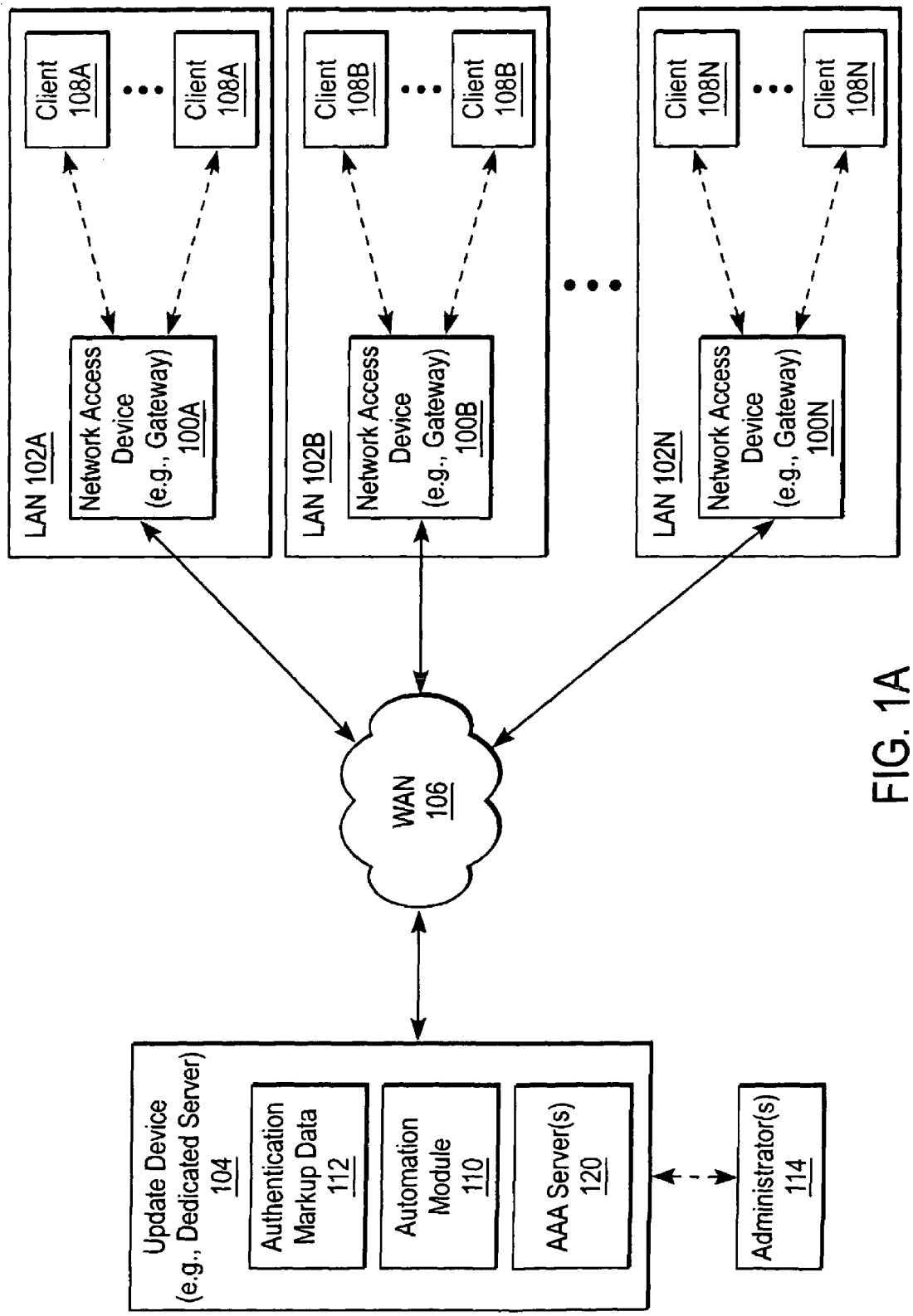
FIGS. 1A and 1B are block diagrams of multiple local area networks, each having a gateway device, associated with an update device through a wide area network, according to one embodiment.

FIG. 1 is a block diagram of multiple first networks (e.g., local area networks or LANs) 102A-102N, each having network access devices 100A-100N (e.g., gateway devices), associated with an update device 104 through a second network (e.g., wide area network or WAN) 106, according to one embodiment. Note that throughout this application, a gateway device is used as an example of a network access device. However, it is not so limited. Other network access devices, such as, for example, a network router, etc., may be applied as well. Similarly, while a LAN is used as an example of a first network and a WAN is used as an example of a second network, other types of networks may also be applied. For example, a first network may be a LAN (e.g., a department of an organization), while a second network may be an Intranet (e.g., a corporate network of the organization). Referring to FIG. 1, according to one embodiment, update device 104 includes an automation module 110 and authentication mark-up data 112, which may be stored in the update device 104. The update device 104 may further includes an authentication, accounting, and authorization (AAA) server 120 according to one embodiment. In alternate embodiments, the AAA server 120 may be external to the update device 104, such as, for example, coupled to the WAN 106 and may offer primarily authentication services or other services. The authentication mark-up data 112 is generated via a variety of ways, such as, for example, by an administrator (e.g., a network engineer) and/or automatically based upon at least one of a number of metrics (e.g., time of day sensitive, position sensitive, time of year sensitive, and/or an Enterprise Resource Planning (e.g., a ERP system such as Oracle™ 11i) sensitive, etc.) For example, the authentication mark-up data 112 may change depending upon whether the current season is spring or fall, and/or whether there is an overstock of a particular type of merchandise for sale. If the particular type of merchandise is overstocked, the authentication mark-up data 112 that is used to construct an authentication page may include a banner advertisement indicating a lower price generated by the ERP system, for example.

The wide area network 106 connects the update device 104 to the multiple local area networks 102A-102N. A local area network 102A connects a gateway device 100A to the update device 104 through the wide area network 106. A local area network 102B connects a gateway device 100B to the update device 104 through the wide area network 106. A local area network 102N connects a gateway device 100N to the update device 104 through the wide area network 106. Not that LANs 102A-102N are shown in FIG. 1 are shown for the purposes of illustration only. More or less LANs may be implemented dependent upon specific network configurations. According to one embodiment, a secure connection is formed between at least one of the gateway devices 100A-100N and the update device 104 using at least one of a virtual private network protocol (VPN), a hypertext transport protocol secure socket layer protocol (HTTPS), a fully qualified domain name protocol (FQDN), and at least one internet protocol (IP) address.

According to one embodiment, an AAA server may be implemented internal or external to a gateway device, such as, for example, within any one of the gateway devices 100A-100N. For example, an AAA server may be external to the gateway device 100B, and an AAA server may be inside the update device 104 is accessed by the gateway device 100N through the wide area network 106, according to the one embodiment. In alternate embodiments, one or more AAA servers may be internal and/or external to any one of the gateway devices 100A-100N, may be shared by multiple gateway devices 100A-100N across any of the local area networks 102A-102N, and/or the wide area network 106. Alternatively, an AAA server may be implemented as a stand-alone server 120 coupled to the WAN 106 and accessible by gateway devices 100A-100N. Further, some or all of the gateway devices 100A-100N and the update device 104 may share the same authentication server(s), such as, for example, authentication server 120. Other configurations may exist.

According to one embodiment, any one of the networks 120A-120N may be a wired or wireless network. For example, a wireless network may be implemented as one of the variety of wireless technologies, such as, for example, Bluetooth, wireless local area network (WLAN) (e.g., IEEE 802.11 compatible network), infrared (IR), etc. Similarly, any one of clients 108-109 and 118-119 may be a wired or wireless device. For example, anyone of the clients 108-109 and 118-119 may be a cellular telephone, personal digital assistant (PDA), a portable personal computer (PC), personal communicator (e.g., a two-way pager), or a combination of these.

Figure 1B:
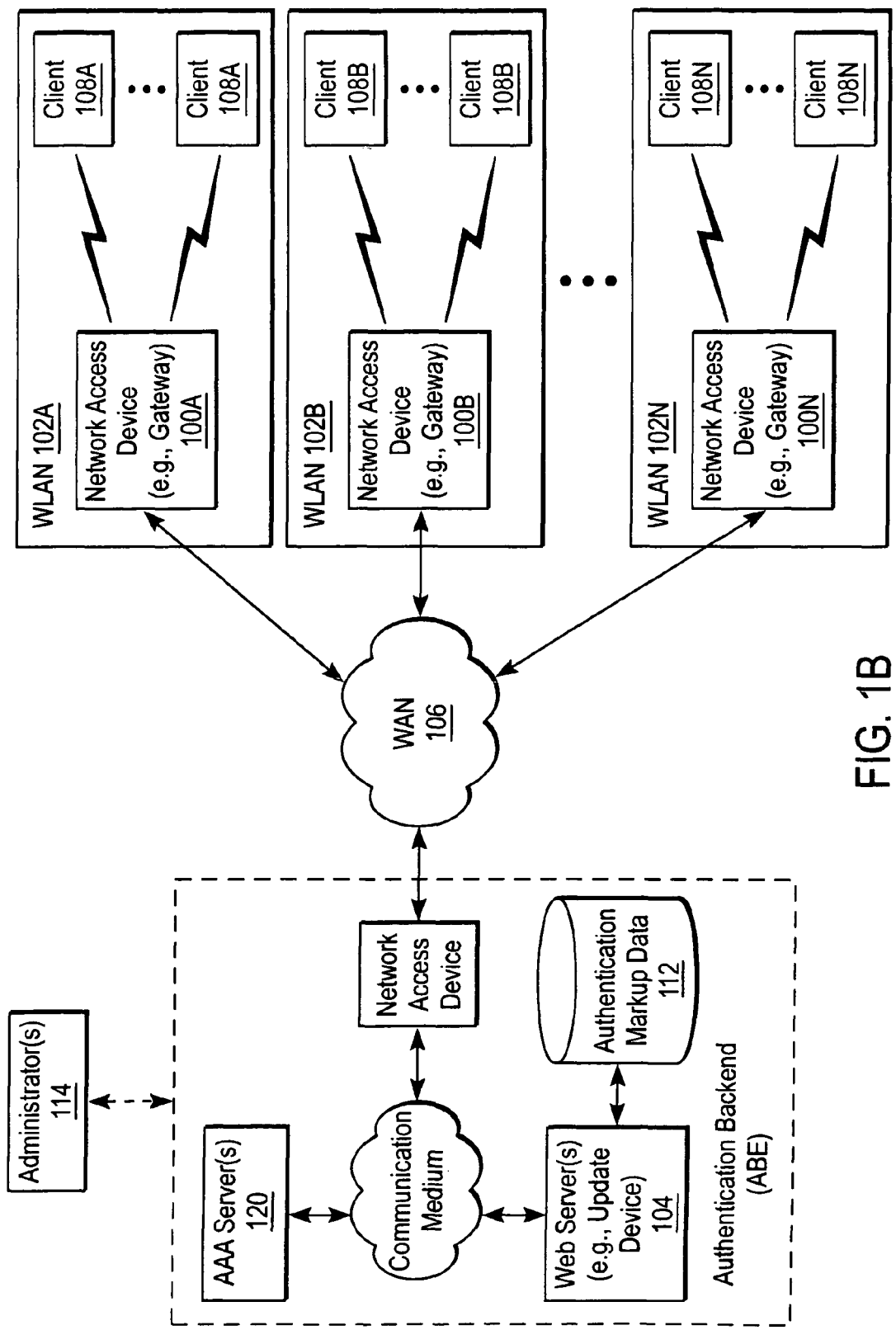

FIG. 1B is a block diagram illustrating an example of network configuration according to an alternative embodiment. In this embodiment, an authentication backend (ABE) is implemented as another LAN behind another network access device. Also, although it is not so limited, each of the LANs 102A-102N may be implemented as a WLAN and each of the gateway devices 100A-100N may include an access point coupled or built-in in the respective gateway device. Other configurations may exist.

Figure 2:
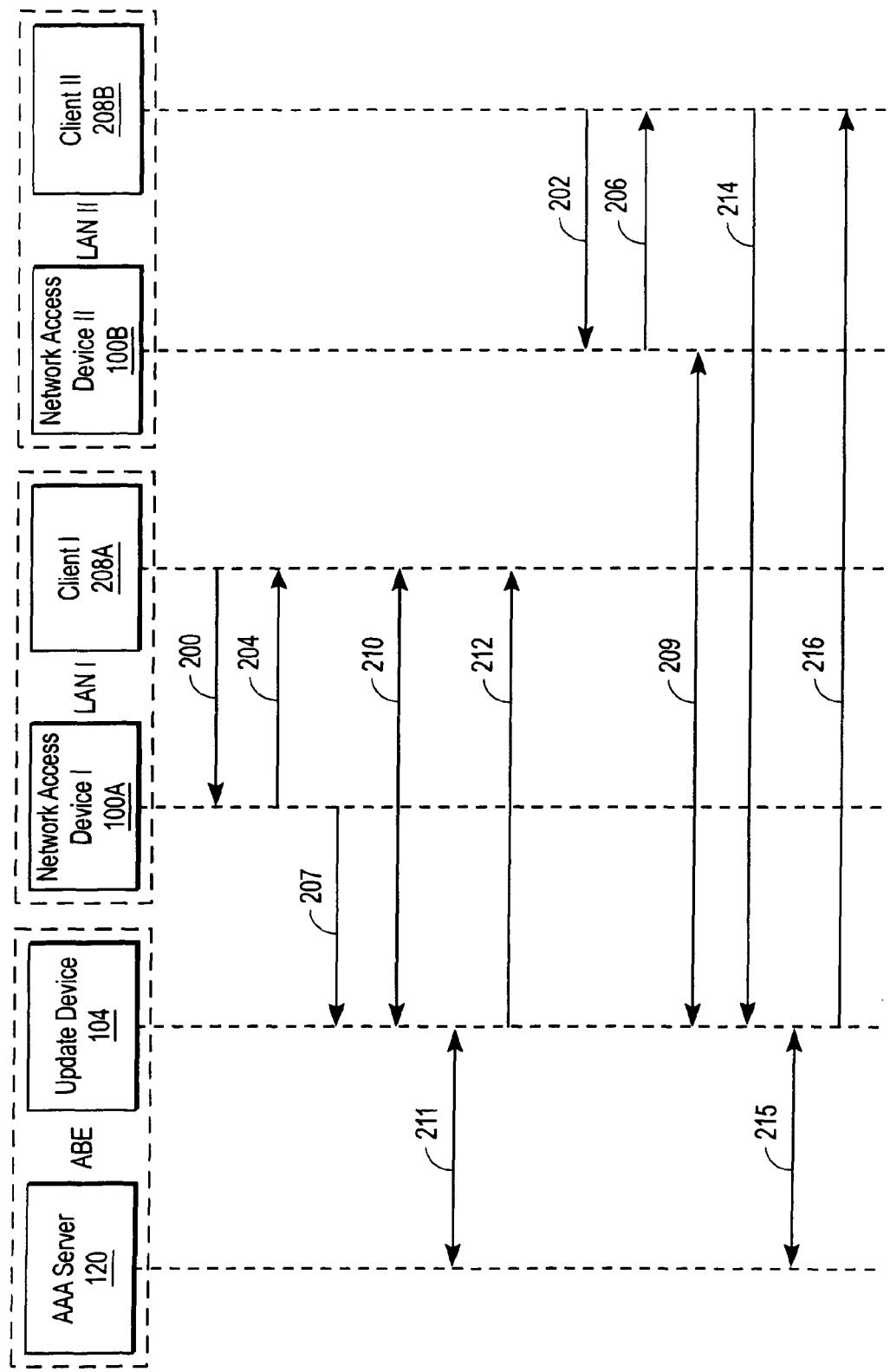
FIG. 2 is a data interaction diagram between client devices, gateway devices, authentication servers, and the update device, according to one embodiment.

FIG. 2 is a data interaction diagram between client devices 208 (e.g., may be similar to the client devices 108 in FIG. 1), gateway devices (a gateway device 100A, a gateway device 100B), authentication servers 120, and the update device 104, according to one embodiment. In operation 200, a client device 208A associates (e.g., obtains an IP address from dynamic host control protocol (DHCP) and/or using a dynamic address translator (DAT)) with the gateway device 100A. Similarly, in operation 202, a client device 208B associates with the gateway device 100B. Note that portions of the reference numbers are maintained identical with respect to FIG. 1 for the purposes of clearer illustration.

In operation 204, the gateway device 100A redirects the client device 208A to the shared authentication page (e.g., using at least a portion of the authentication mark-up data 112 so that a user on the client device 208A can be authenticated to access the wide area network 106 through the AAA server 120). Similarly, in operation 206, the gateway device 100B redirects the client device 208B to the shared authentication page (e.g., using at least a portion of the authentication mark-up data 112 so that a user on the client device 208B can be authenticated to access the wide area network 106 through the AAA server 120).

According to one embodiment, a list of at least one defined internet protocol (IP) address and at least one port name is maintained on each of the gateway devices 100A-100N to specify permitted communication channels between the gateway devices 100A-100N and the update device 104. In one embodiment, the list includes a unique firewall identifier (e.g., an alphanumeric or numeric number, and/or a MAC address) of each of the gateway devices to further specify permitted communication channels.

In an alternate embodiment, an authentication page is constructed and transmitted (e.g., pushed or multi-cast) from the update device 104 to the gateway device 100A, the gateway device 100B, as well as other gateway devices (not shown), and stored (e.g., cached) in each of the gateway devices. In addition, in an alternate embodiment, a query string having the unique firewall identifier may be hashed (e.g., a variable-sized amount of text may be converted into a fixed-sized output) to prevent tampering and least one of the gateway devices 100A and 100B may periodically request operational status of the update device 104.

Next, in operation 207, the gateway devices 100A and 100B each perform a status check of the update device 104 (e.g., the update device 277 may be a web server optimized to host and manage one or more authentication pages). In alternate embodiments, gateway device 100A may perform the status check, and inform results of the status check to other gateway devices (e.g., across multiple LANs) using a particular protocol (e.g., STMP, HTTPS, etc.). Then, in operation 210, the client device 208A provides authentication information (e.g., a user of the client device 208A may enter information such as name, date, credit card number, etc. in data entry fields visible on the shared authentication page) to the update device 104. Similarly, in operation 214, the client device 208B provides authentication information to the update device 104.

After operation 210 is performed, in operation 211, the AAA server as a part of the ABE or alternatively accessible by the gateway device 100A authenticates the client device 208A (e.g., based upon a user ID and password entered into the client device 208A by the user of the client device 208A). Similarly, after operation 214 is performed, in operation 215, an external AAA server coupled to the gateway device 100B authenticates the client device 208B.

Finally, after operation 211 is performed, in operation 212, the client device 208A is either permitted to access a desired location (e.g., a particular website and/or network) on the wide area network 106, or denied access based upon results of the authentication performed by the AAA server 120. Similarly, after operation 215 is performed, in operation 216, the client device 208B is either permitted to access a desired location (e.g., a particular website) on the wide area network 106, or denied access based on results of the authentication performed by the AAA server 120.

It will be appreciated that at least a portion of the authentication mark-up data 112 is shared across multiple local area networks 102A-102N. As a result, an administrator such as administrator 114 can centrally control the authentication markup data 112 which can then be propagated into one or more authentication pages used by one or more of the gateway devices 100A-100N (e.g., the authentication mark-up data 112 for a variety of geographically dispersed retail branch locations). The authentication pages may be generated within the update device and transmitted to one or more gateway devices. Alternatively, each of the gateway devices may download the updated authentication markup data from the update device to construct a respective authentication page in response to a notification from the update device or by periodically polling the update device. Furthermore, the update device may directly host the authentication page(s) and accessible by some or all of the gateway devices.

For example, a bank having multiple retail branch locations across the world can quickly (e.g., by creating authentication mark-up data 112 on a central update device 104) and create a new authentication page to customers in various branch locations around the world. In alternate embodiments, the update device 104 may have multiple different authentication pages using authentication mark-up data 112, each designed specifically for certain retail locations, where at least two of the authentication pages share at least a portion of the authentication markup data. The update device 104 may decide which one of the multiple authentication pages or which portion of the authentication mark-up data 112 to select based upon a certain criteria of at least one of retail location, LAN, and or gateway device (e.g., based on country, geography, size of retail location, performance, etc.). For example, retail branch locations of the bank in Japan may display an authentication page written in Japanese, while retail branch locations of the bank in India may display an authentication page written in Hindi and/or English.

Figure 3:
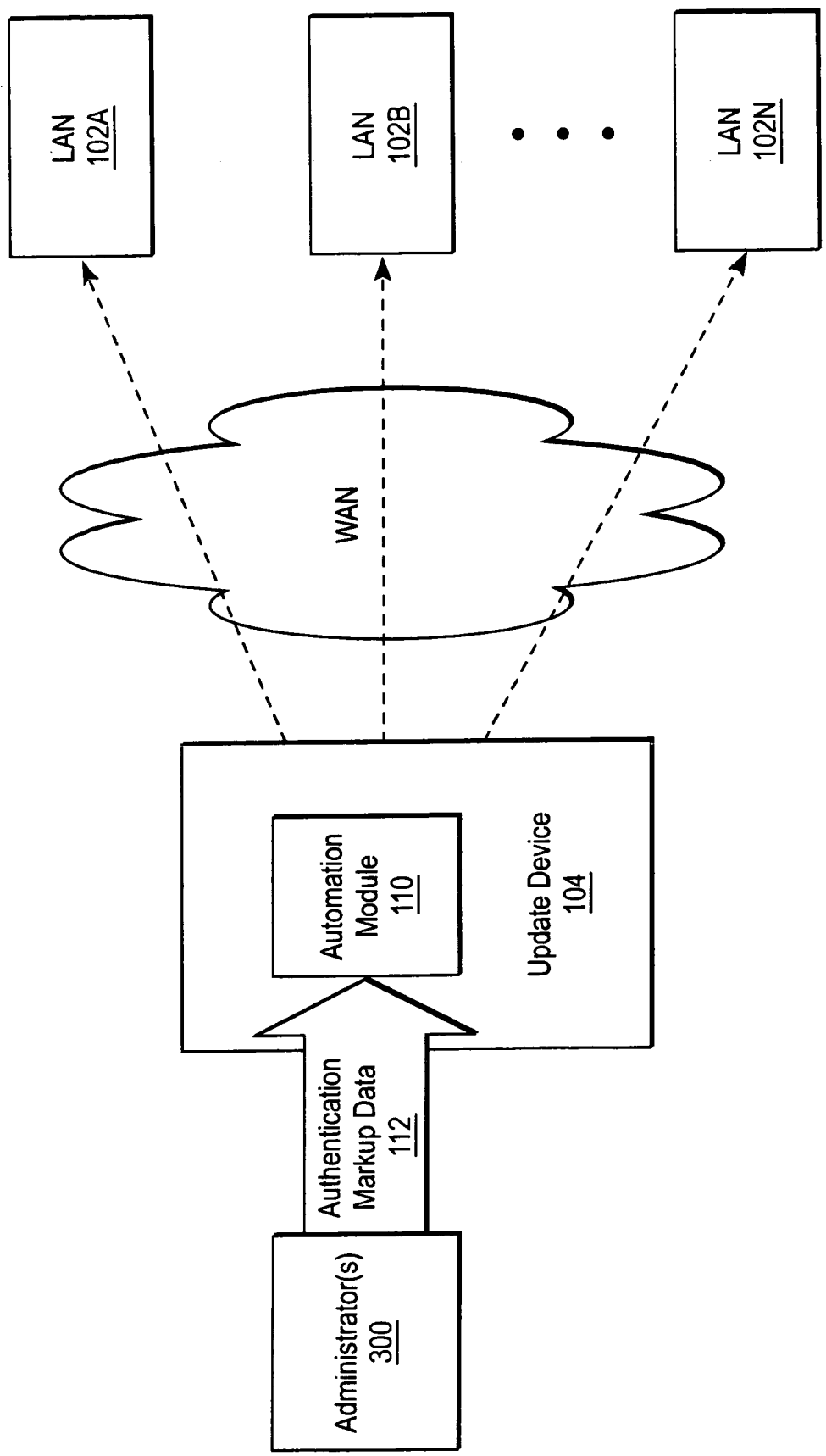
FIG. 3 is a data interaction diagram illustrating an automatic broadcast of a master authentication mark-up data from an automation module in the update device to any number of local area networks, according to one embodiment.

FIG. 3 is a data interaction diagram illustrating an automatic transmission of authentication mark-up data (e.g., the authentication mark-up data 112) from an automation module (e.g., the automation module 110) in the update device 104 to any number of local area networks 102A-102N, according to one embodiment. The administrator 300 (e.g., a network administrator/engineer) uploads the authentication mark-up data 112 into the update device 104 using the automation module 110. The automation module 110 transmits (e.g., individually or via multi-cast) the authentication mark-up data 112 (e.g., the shared authentication page) to various gateway devices in different local area networks 102A-102N.

By sharing the authentication mark-up data 112 across multiple local area networks 102A-102N, a business having multiple locations can update an authentication page using some or all of the same authentication markup data across multiple local area networks. As a result, an administrator may centrally manage the authentication markup data used to construct authentication page(s). For example, a headquarter location of a coffee shop may disseminate a unique shared authentication page to all of its retail locations without requiring specially trained employees in each retail location to manually update authentication pages on their local gateway devices.

FIG. 4 is a process flow diagram of generating and associating authentication mark-up data 112 across multiple local area networks (e.g., the gateway devices 100 of FIG. 1), according to one embodiment. For example, process example 400 may be performed by an update device (e.g., update device 104 of FIG. 1). Referring to FIG. 4, in operation 402, authentication mark-up data 112 is generated (e.g., by an administrator 300 of the update device 104 as described in FIG. 3), where the authentication markup date may be used to generate one or more authentication pages for different gateway devices of different LANs. In operation 404, at least a portion of the authentication mark-up data 112 is associated with each of the of gateway devices 100A-100N based upon a decision criteria (e.g., based on a data of at least one of a plurality of retail locations associated with at least some of the plurality of gateway devices, wherein the data is chosen from a group comprising country, geography, size, and performance of at least some of the plurality of retail locations).

In operation 406, the authentication mark-up data 112 is automatically associated with at least two of the gateway devices (e.g., using the automation module 110 of the update device 104 as described in FIG. 1) across multiple local area networks 102A-102N (e.g., a particular gateway device 100A may redirect a user of a client device 108 associated with the particular gateway device 100A to the at least one master authentication mark-up data 112).

In operation 408, at least one master authentication mark-up data 112 is stored in the update device 104. In one embodiment, a retry message may be displayed to the user when the at least one master authentication mark-up data 112 is unavailable and when a timer of at most 10 minutes has expired. In one embodiment, the timer of at most 10 minutes ensures an optimum interval for ensuring that the master authentication mark-up data 112 has not gone stale for most common networking scenarios. In one embodiment, a secure connection may be formed between at least some of the gateway devices 100A-100N and the update device 104 using a variety of techniques set forth above. In addition, a query string having the unique firewall identifier may be hashed to prevent tampering.

FIG. 5 is a process flow diagram of redirecting a user associated with a gateway device (e.g., the gateway device 100A) to an update device (e.g., the update device 104), according to one embodiment. Referring to FIG. 5, in operation 501, according to one embodiment, a gateway device receives a request from a client over a LAN for accessing a destination over a WAN, where the gateway device provides interface between the LAN and the WAN. In operation 502, a user is redirected from the gateway device 100A to an authentication page created using authentication mark-up data 112 stored in the update device 104. The authentication mark-up data 112 is shared among multiple gateway devices (e.g., the gateway device 100A and the gateway device 100N) across any number of local area networks 102A-102N to generate one or more authentication pages for LANs 102A-102N. Note that the authentication page(s) may be hosted by an update device and/or a gateway device. However, the authentication page(s) may be created using the centralized stored and managed authentication markup data within the update device. In operation 503, an authentication facility (e.g., an AAA server) is invoked to authenticate the client via the authentication page(s) and returns a response back to the gateway device based on a result of the authentication operations. During the operation 503, a user of the client may respond to the authentication page(s) to provide authentication information to the authentication facility, such as, for example, user name and password, etc. Note that the authentication facility may be implemented within the update device or a gateway device. Alternatively, the authentication facility may be a stand-alone AAA server coupled to the WAN and shared by some or all of the gateway devices and/or the update device. In operation 504, a response to the authentication page(s) is received at the gateway device and forwarded from the gateway device to the client. In operation 505, a retry message may be displayed to the user when the at least one master authentication mark-up data 112 is unavailable and when a predetermined period of time (e.g., using a timer of at most 10 minutes) has expired. Other operations may also be performed.

As described above, the communications mechanisms between a gateway device and an update device can be applied to an update device of a wired network and one or more gateway devices of wireless networks. The communications mechanisms set forth above may also be referred to as Lightweight Hotspot Messaging (LHM) which defines the method and syntax for communications between wireless gateway device, such as, for example, a SONICWALL wireless access device (e.g., a SOHO TZW, a TZ170 Wireless, or a SonicPoint with a governing SONICWALL security appliance) and an Authentication Back-End (ABE) for the purpose of authenticating Hotspot users and providing them parametrically bound network access.

Throughout the rest of the application described below, a SONICWALL wireless platform or a SONICWALL security appliance may be used as an example of a gateway device and a Web server is used as an example of an update device. However, other types of gateway devices and update devices may be applied.

In one embodiment, LHM allows network operators to provide centralized management of multiple Hotspot locations by providing an interface between SONICWALL's Wireless Guest Services and any existing ABE. In a particular embodiment, LHM is an adaptation of the generalized WISPr and GIS specifications. LHM was designed to satisfy the requirements of a particularly common operational environment rather than a broad set of environments. Specifically, according to one embodiment, LHM allows for Hotspot user-management and authentication to occur entirely on the network operator's ABE, supporting any method of account creation and management, and any extent of site customization and branding. This approach enables integration into any existing environment without dependencies upon particular billing, accounting or database systems, and also provides the network operator with unrestricted control of the site's design, from look-and-feel to redirection.

In one embodiment, an ABE includes a Web Server (WS) to host content for user interaction and an (optional) Authentication Server (AS) to provide directory services authentication, for example, as shown in FIG. 1B. The AS can be any kind of user database, including, but not limited to RADIUS, LDAP, or AD. It is appreciated that the WS can communicate with the AS for authentication purposes. The WS and AS can be administered on a single server or on separate servers.

In addition, LHM also provides the ability for the AS to use the SONICWALL security appliance's internal user database for user authentication. The ABE may need to communicate with the Hotspot SONICWALL to exchange result codes and session information. Most of the communications may be HTTPS and can occur either directly (such as to the LAN, WAN, X0 interface of the SONICWALL security appliance) or over a VPN tunnel to one of the SONICWALL security appliance's management interface addresses. The LHM management interface may be selectable and the selected interface will accept LHM management messaging through automatically added access rules.

Further, LHM communications may occur on a specific LHM management port that may be defined on the SONICWALL security appliance, and the LHM management port may be different from the standard HTTPS Management port. A list of IP addresses may also be defined on the SONICWALL security appliance specifying the IP addresses LHM management communications will allow.

To allow the ABE to communicate with the SONICWALL, and to redirect clients to the appropriate interface on the SONICWALL, according to certain embodiments, two parameters may be constructed by the SONICWALL and passed to the ABE. In one embodiment, the following communication parameters may be used for communications between the ABE and the SONICWALL.

A management base URL (universal resource locator) (e.g., baseMgmtUrl)—The IP address and the port that the ABE uses to communicate with the SONICWALL. It will be composed of the HTTPS protocol designator, the IP of the selected LHM management interface, and the LHM port.

A client redirect URL (e.g., clientRedirectUrl)—The IP address (and optionally the port) on the SONICWALL to which clients will be redirected during various phases of the session, i.e. the LAN management IP on the TZW, or the WLAN IP on a SonicOS Enhanced device.

The parameter values set forth above may be passed to the ABE by the SONICWALL during Session Creation operations and during the Session State Sync (see the Message Format section), and they may be used by the ABE as a basis in the construction of some or all of the relevant URL's. In particular embodiment, the following are the pages on the SONICWALL that may be referenced by the ABE:

A service unavailable page (e.g., wirelessServicesUnavailable.html)—ABE is unavailable message. This redirection will typically be sent by the SONICWALL, but can also be referenced by the ABE. Text is configurable, for example, via a GUI (graphical user interface) shown in FIG. 6C.

An external guest redirect page (e.g., externalGuestRedirect.html)—Initial redirect message provided by the SONICWALL on session creation. Text is configurable, for example, via the GUI shown in FIG. 6C.

An external guest login page (e.g., externalGuestLogin.cgi)—The page to which the ABE POSTs session creation data.

An external guest logoff page (e.g., externalGuestLogoff.cgi)—The page to which the ABE POSTs session termination data.

A local guest login page (e.g., localGuestLogin.cgi)—The page to which the ABE POSTs for authenticating user credentials against the SONICWALL's internal user database.

A guest create account page (e.g., createGuestAccount.cgi)—The page to which the ABE POSTs to create a guest account in the SONICWALL's internal user database.

Figure 6A:
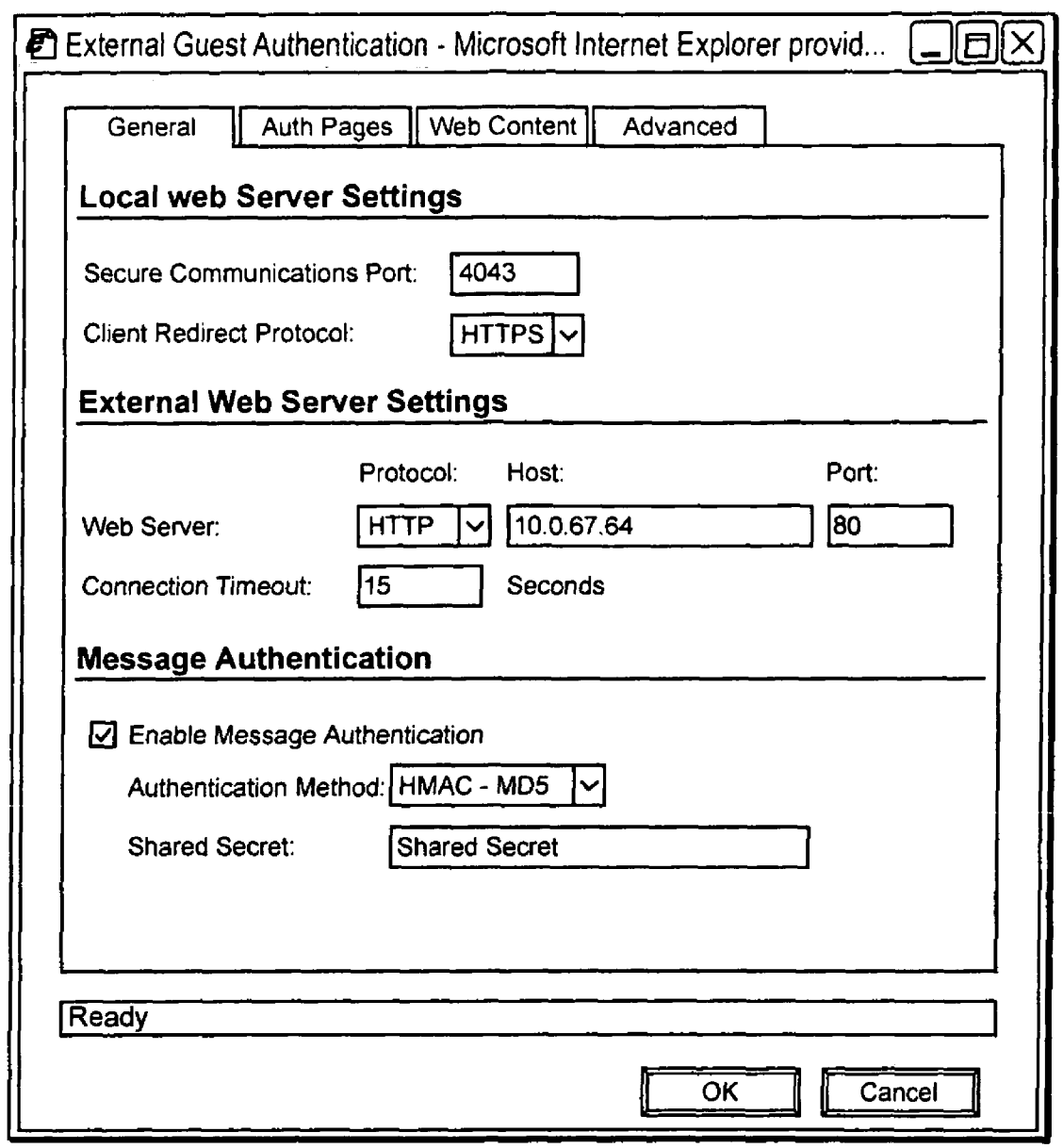
FIGS. 6A-6D are examples of GUIs that may be used to configure an update device and/or gateway devices.
Figure 6B:
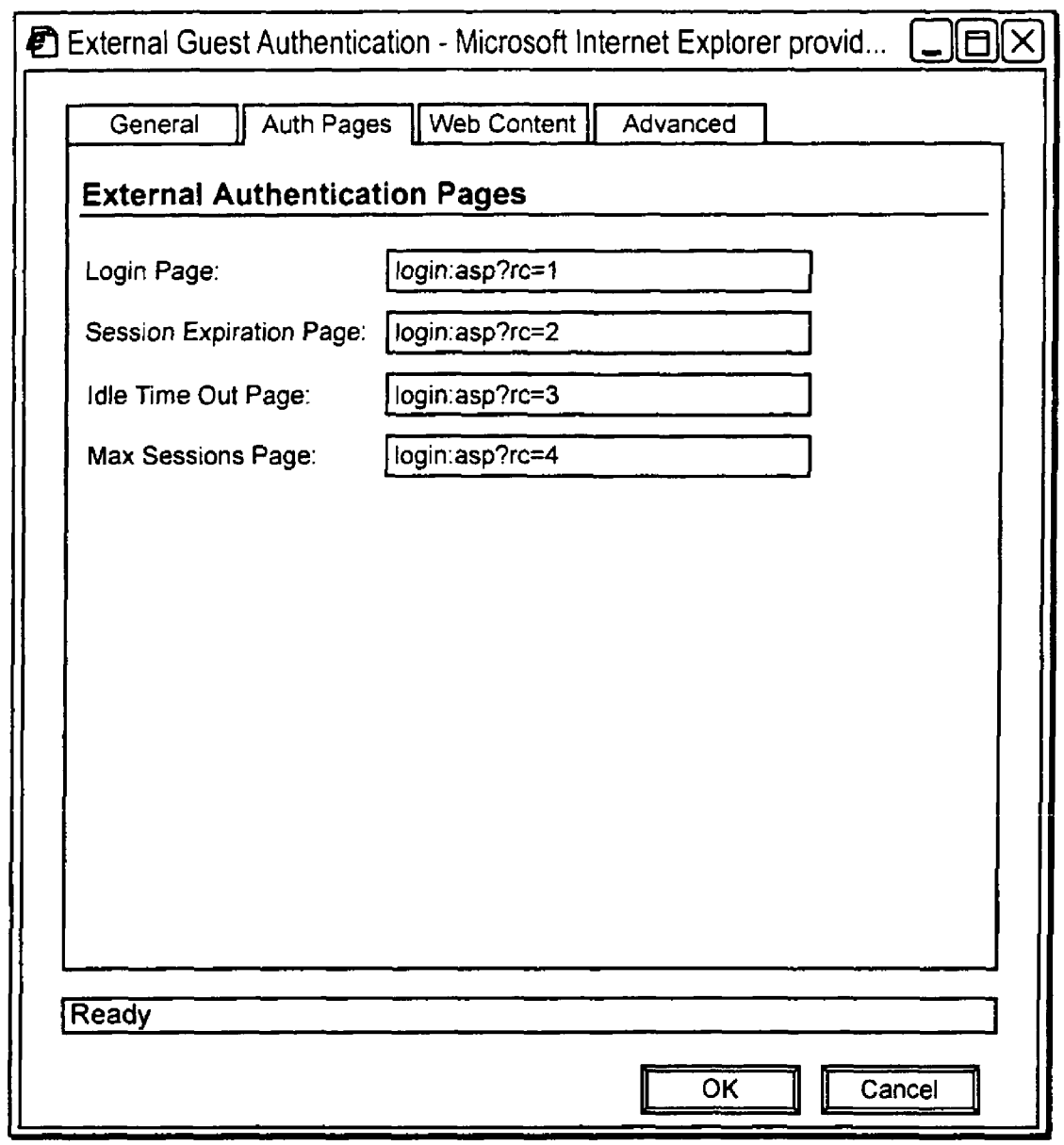
Figure 6C:
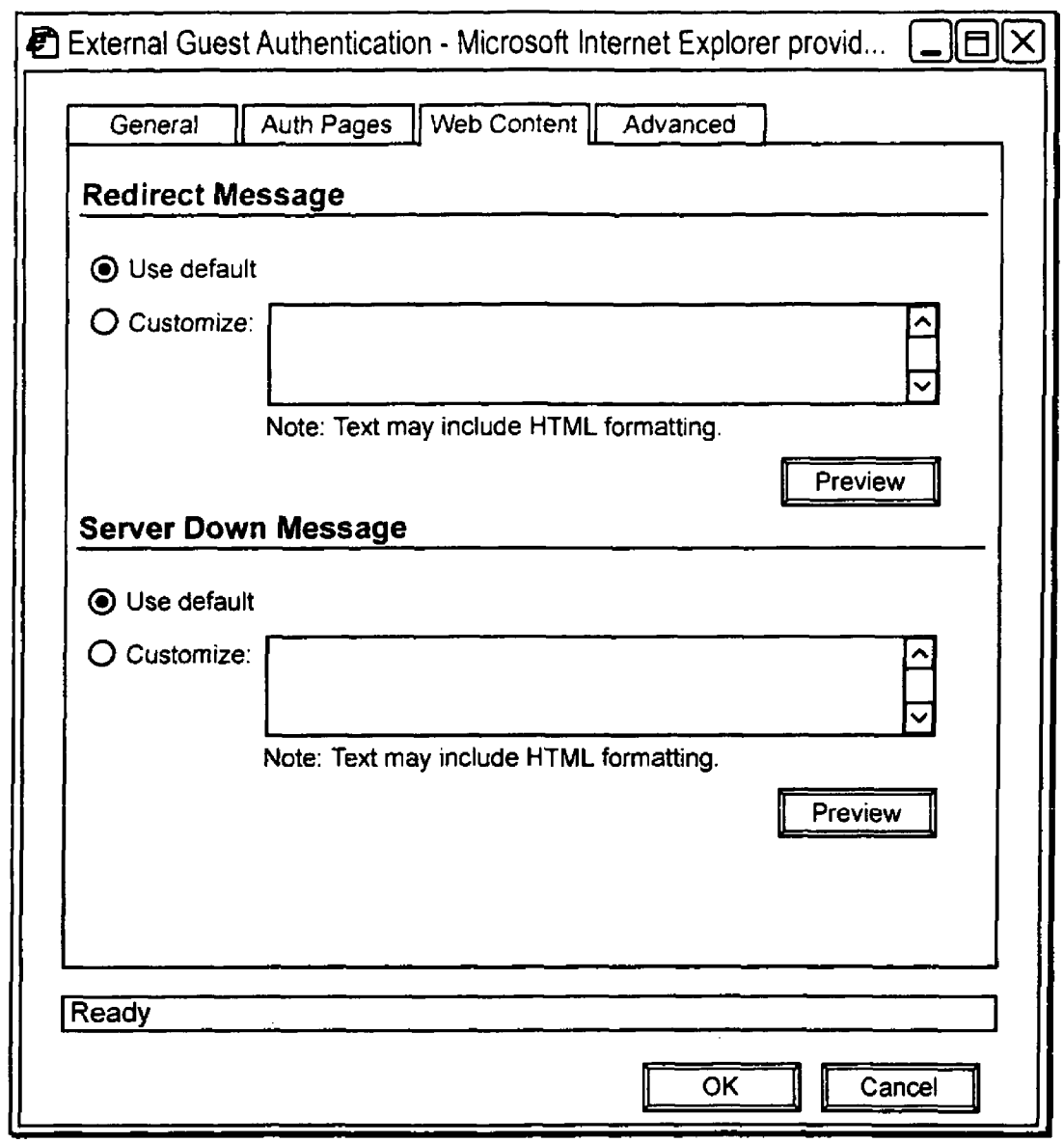
Figure 6D:
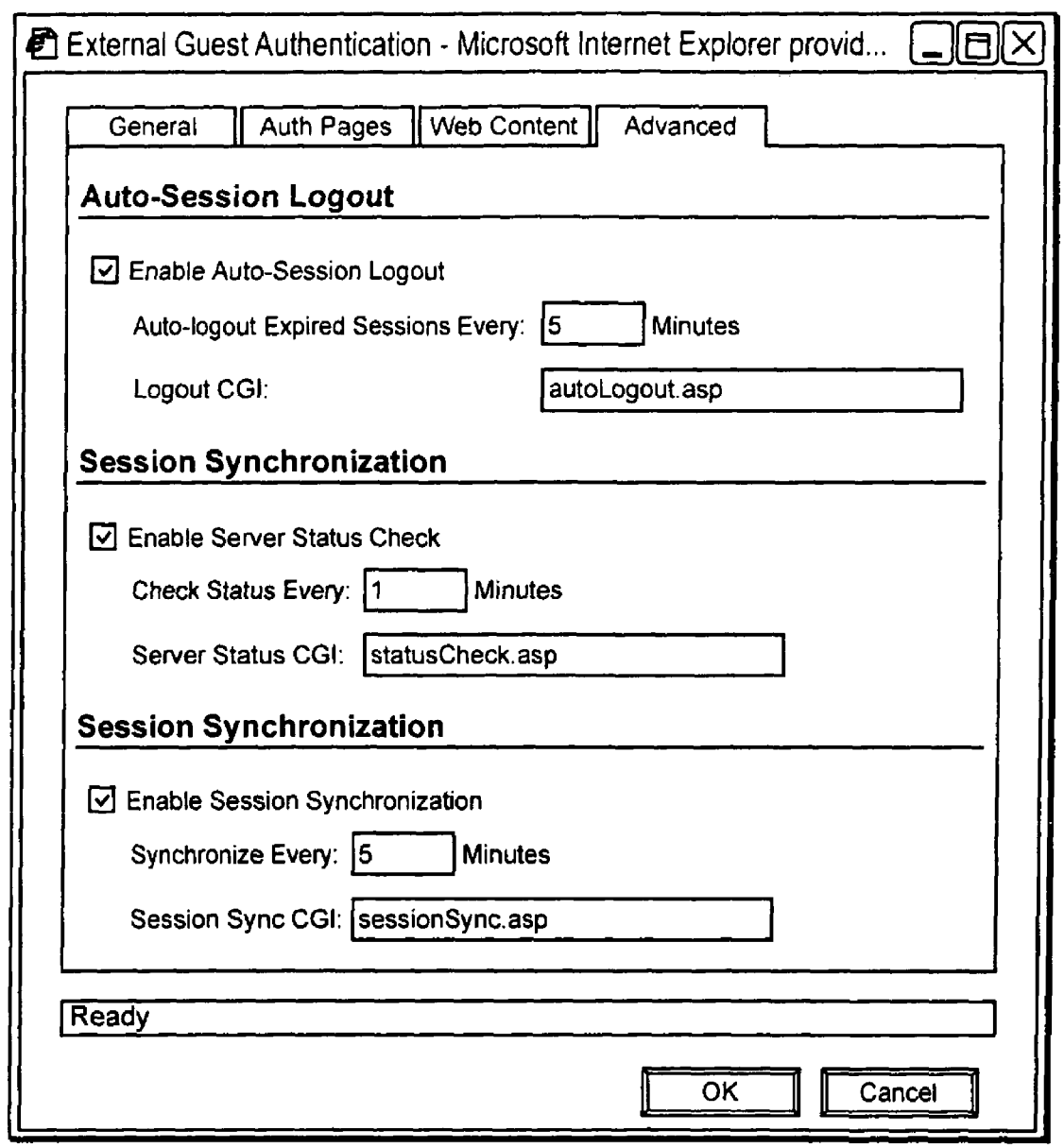

For communications from the SONICWALL to the ABE, URLs (including host, port, and page/resource) hosted on the ABE may be fully configurable at the SONICWALL, for example, via GUIs shown in FIGS. 6A and 6B. The host can be specified using either an IP address or FQDN. When using FQDN, the name may be resolved upon first use and will be stored by the SONICWALL as an IP address. Additional information may also be configured, for example, via GUI shown in FIG. 6D.

Figure 7:
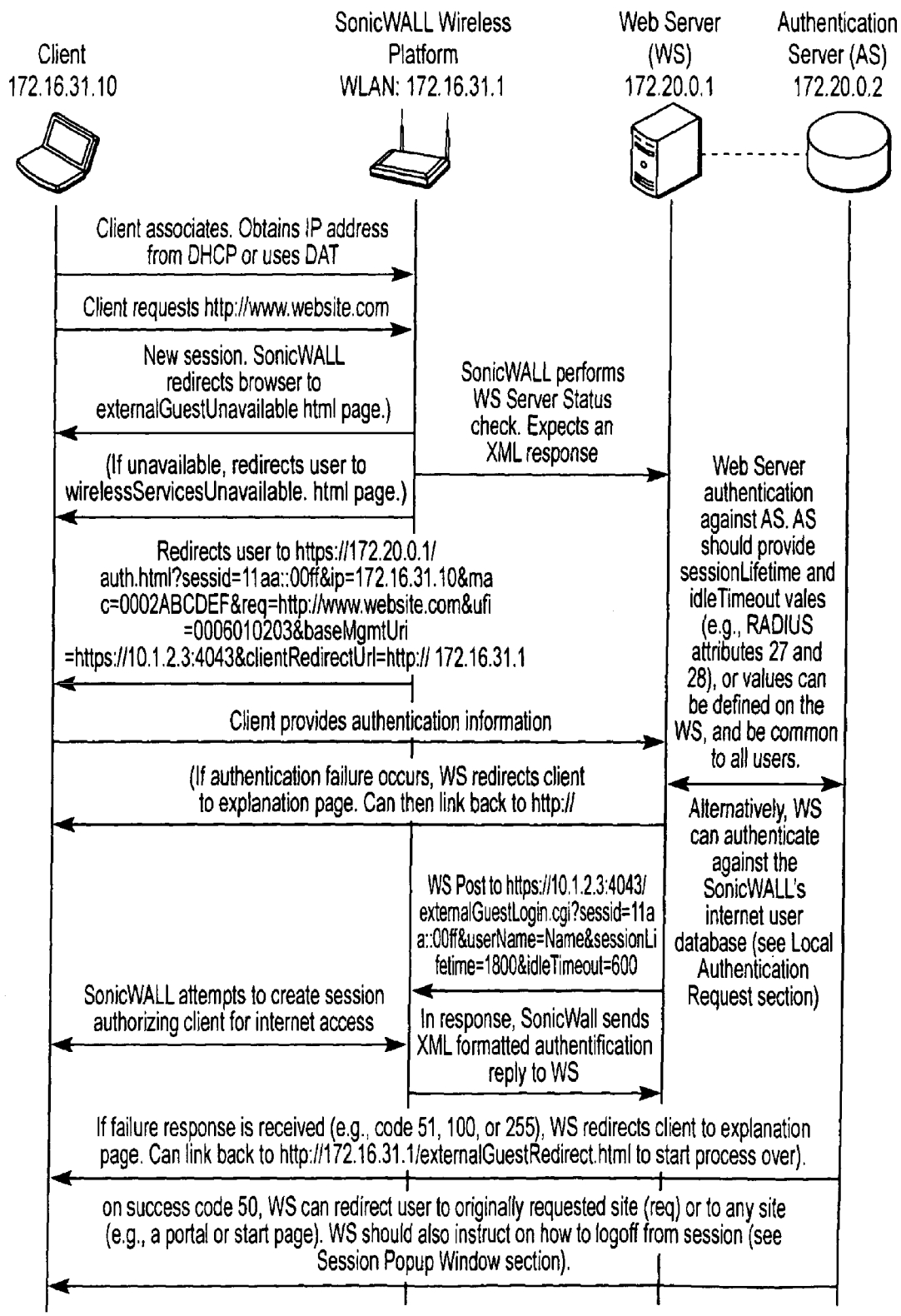
FIGS. 7-8 and 9A-9B are flow diagrams illustrating certain processes according to certain embodiments.

In one embodiment, the phases of a session lifecycle include the following sections:
Session Creation
  Session Window Popup
Idle Timeout
Session Timeout
User Logout
Administrator Logout
WS Server Status Check
Session State Sync A session creation occurs when a wireless client attempts access, and the SONICWALL has no active session information for that client based upon MAC address. FIG. 7 is a flow diagram illustrating an example of a session creation according to one embodiment. As shown in FIG. 7, a session creation may include the following operations:

1. Wireless client associates with SONICWALL and obtains IP Address from internal DHCP server, or uses static addressing with Dynamic Address Translation (DAT) feature.

2. Client requests web-resource (e.g., http://www.website.com).
   a. SONICWALL determines that this is a new session.
3. SONICWALL redirects client to internally hosted externalGuestRedirect.html page. The externalGuestRedirect.html page provides administrator configurable text explaining that the session is being redirected for authentication.
4. During this redirect, the SONICWALL determines the availability of the ABE (e.g., via a JavaScript redirect attempt to the configured target redirect page).
   a. If the redirect to the WS fails to occur within a specified period (the value will be configurable on the SONICWALL, such as, for example, between 1 and 30 seconds) the SONICWALL will redirect the session the internal "wirelessServicesUnavailable.html" page.
5. In addition to the availability check, an optional full "WS Server Status Check" may be available from the SONICWALL. This option can be configured to run at a configurable interval, such as, for example, between 1 and 60 minutes. In the event of an error response code (e.g., 1, 2, or 255), the SONICWALL may log the response and will redirect the browser to the internal "wirelessServicesUnavailable.html" page. This page will provide administrator configurable text explaining recourse.
6. If available, the SONICWALL redirects client to authentication portal hosted on AS such as, for example, at: https://172.20.0.1/auth.html?sessId=11aa::00ff&ip=172.16.31.10mac=0002AB CDEF&req=http://www.website.com&ufi=0006010203&baseMgmtUrl=https://10.1.2.3:4043&clientRedirectUrl=http://172.16.31.1, where
   a. "sessId"—A 32 byte hex representation of a 16 byte MD5 hash value generated by the SONICWALL, which will be used by the SONICWALL and the WS for indexing clients (e.g. "11aa3e2f5da3e12ef978ba120d2300ff").
   b. "ip"—The client IP address.
   c. "mac" is the client MAC address.
   d. "req"—The originally requested web-site is passed as an argument to the authentication server)
   e. "ufi"—The SONICWALL Unique Firewall Identifier. To be used for site identification, if desired.
   f. "baseMgmtUrl"—The protocol, IP address, and port on the SONICWALL with which the IP will subsequently communicate.
   g. "clientRedirectUrl"—The protocol, IP address (and optionally port) on the SONICWALL that the ABE will use for client redirection.
7. Client provides authentication information (e.g. username, password, token, etc.).
8. WS validates user against AS, where
   a. AS provides session specific information, namely, Session Timeout and Idle Timeout values.
   b. Session specific values can optionally be applied globally by the WS rather than obtained from the AS; some value simply needs to be passed to the SONICWALL.
   c. Timeout values will be presented in seconds and can range from, for example, 1 to 863,913,600 (equal to 9999 days).
9. If authentication fails, the WS should redirect the client to a page explaining the failure. A link should be provided back to the externalGuestRedirect.html to restart the process.

10. If successful, the WS connects to the SONICWALL either via HTTPS or via VPN and POSTs, for example, at:
    https://10.1.2.3:4043/
    externalGuestLogin.cgi?sessId=11aa::
    00ff&userName=
    Name&sessionLifetime=1800&idleTimeout=600
    a. The SONICWALL may attempt to create the session and will send a result to the WS in the same connection.
11. If failure response is received (e.g. code 51, 100, or 255), WS may redirect client to a page explaining the failure. A link can be provided back to externalGuestRedirect.html to start process over.
12. If successful (e.g., code 50), WS can redirect user to the originally requested site (req) or to any site (e.g. a portal or start page). WS may also instruct on how to logoff from session (e.g. bookmark a page, popup window, URL, etc.).

In one embodiment, sessions may be managed via a Session Popup window. This should be a browser window instantiated at the time of Session Creation providing session time information (e.g. lifetime, idle timeout value, timer countdowns, etc.) and a "Logout" button. Sample code will be provided.

Clicking the "Logout" button ends the session and triggers a "User Logout" event.

Attempting to close the window should provide a warning message that closing the window will end the session.

Closing the window ends the session and triggers a "User Logout" event.

Figure 8:
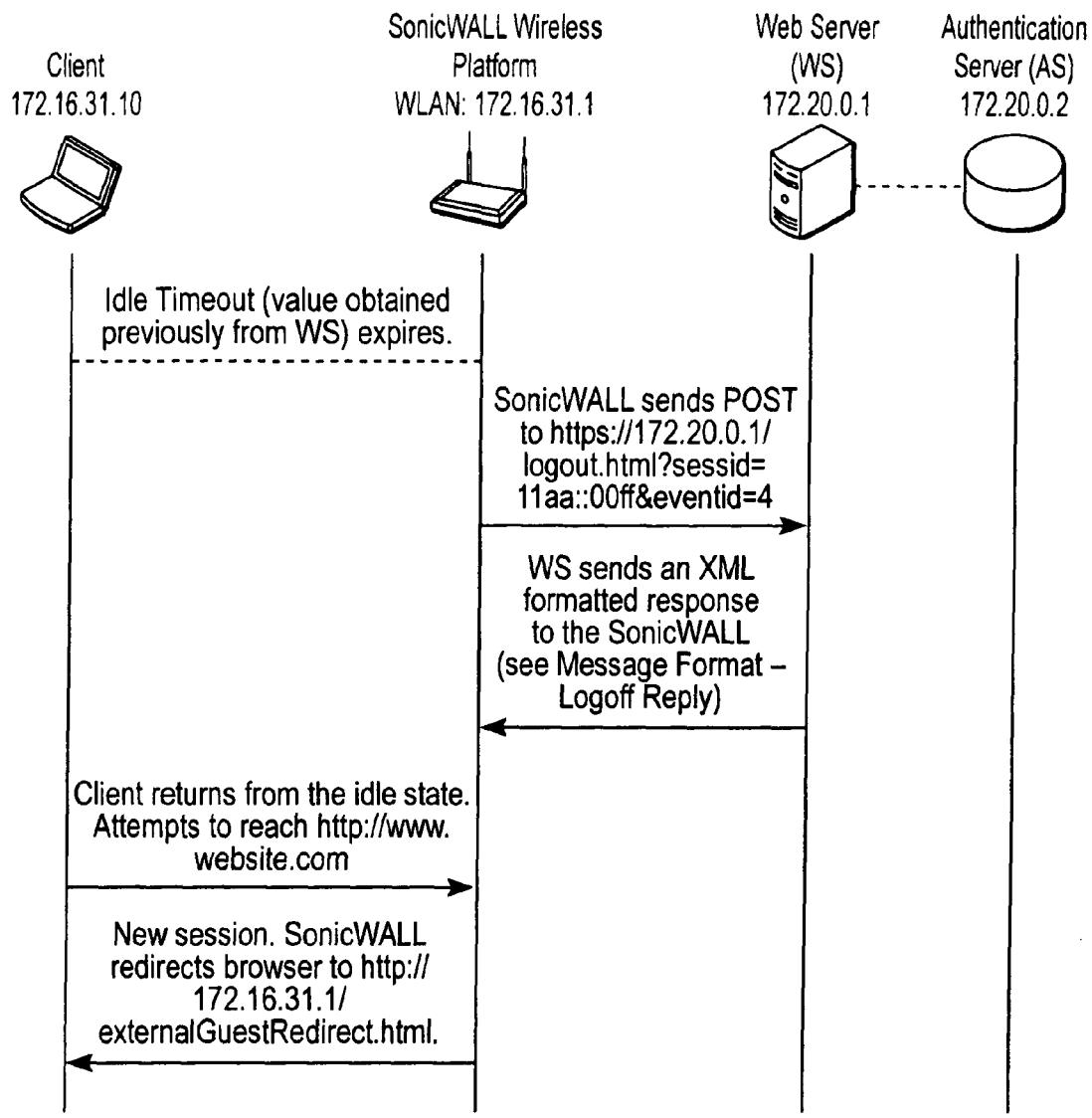

An idle timeout event occurs when the idle timeout is exceeded. FIG. 8 is a flow diagram illustrating an example of an idle timeout process according to one embodiment. As shown in FIG. 8, an idle timeout process may include the following operations:
1. Idle timer (e.g., as set during Session Creation) expires.
2. Since the client's browser may not be open at this time, the SONICWALL sends a POST to the WS at, for example, https://172.20.0.1/logout.html?sessId=11aa::00ff&eventId=4.
    a. The resource to which the POST will be sent will be configurable on the SONICWALL.
    b. The WS hosted page must expect and interpret the sessId and eventId values.
3. The WS will send an XML result to the WS in the same connection.
4. If the client returns from the idle state and attempts to reach a web resource, the SONICWALL will redirect the user to the internal externalGuestRedirect.html page, starting the Session Creation process over.

Similarly, a session timeout event occurs when the Session lifetime expires. The exchange is the same as the Idle Timeout above, except the Session Timeout eventId value is "3" (instead of "4" for an Idle Timeout).

Figure 9A:
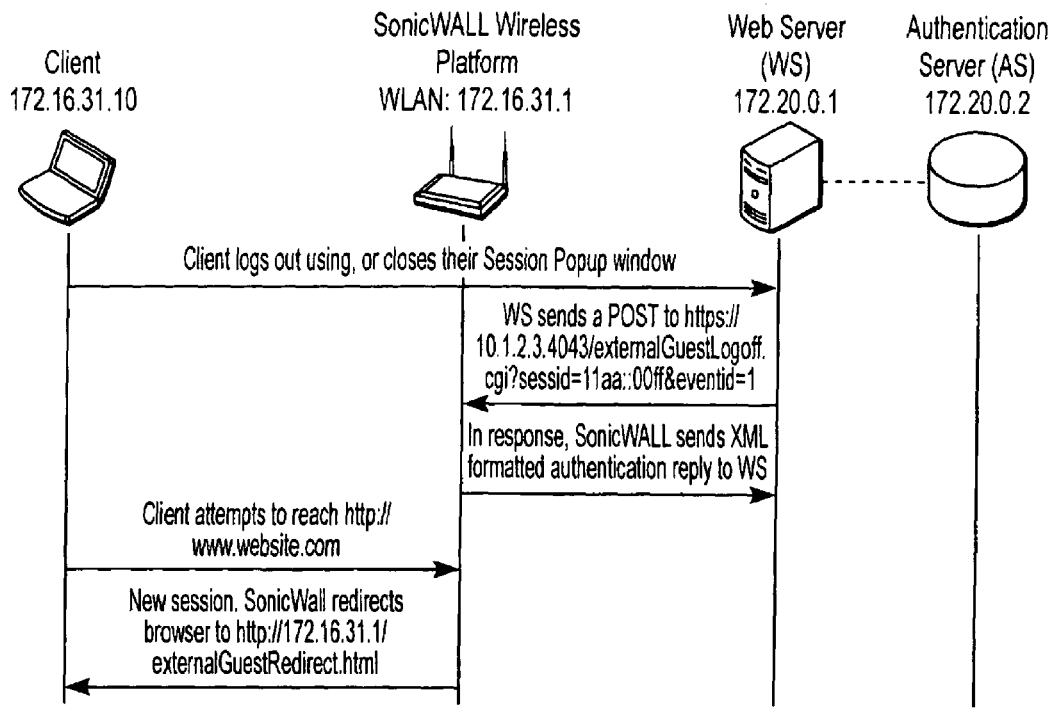

A user logout event occurs when the user actively ends the session by closing their Session Popup window or by using the "Logout" button provided on the Session Popup window. The Session Popup window is the preferred method for user logout, however the same result can be achieved without this method by allowing the session's lifetime to expire. The latter removes the dependency on the popup window, but manages resources less efficiently. FIG. 9A is a flow diagram illustrating an example of a user logout process according to one embodiment. As shown in FIG. 9A, a user logout process may include, but is not limited to, the following operations:
1. Client logs out using, or closes the session popup window.
2. The WS sends a POST to, for example, https://10.1.2.3:4043/externalGuestLogoff.cgi?sessId=11aa::00ff&eventId=1. (see "Message Format" section for Logoff event ID's).
    a. "sessId"—The value generated during Session Creation by the SONICWALL, which is used by the SONICWALL and the WS for indexing clients.
    b. "eventId"—Describes the logoff request event.
3. The SONICWALL responds with a result to the WS in the same connection.
4. If the client attempts to reach a web resource, the SONICWALL will redirect the user to the externalGuestRedirect.html page, starting the Session Creation process over.

Figure 9B:
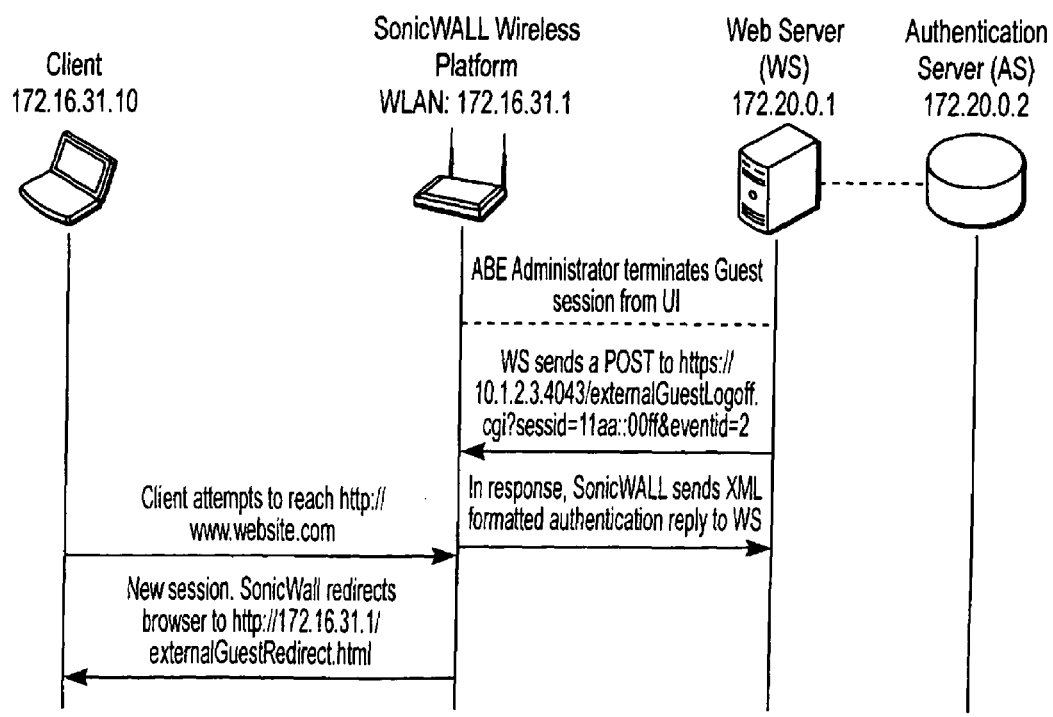

An administrator logout event occurs when the ABE administrator logs out from a Guest session from the management interface. It will not feasible at this time to terminate ABE-established Guest Sessions from the SONICWALL interface itself. ABE-established Guest Sessions may be represented as such (e.g., distinctly from internal WGS Guest Sessions) on the SONICWALL management UI, and will not be editable. FIG. 9B is a flow diagram illustrating an example of an administrator logout process according to one embodiment. In one embodiment, an administrator logout process may include, but is not limited to, the following operations:
1. ABE administrator terminates the Guest session from the management UI.
2. The WS sends a POST to the SONICWALL, for example, https://10.1.2.3:4043/externalGuestLogoffcgi?sessId=11aa::00ff&eventId=2.
    a. "sessId"—The value generated during Session Creation by the SONICWALL, which is used by the SONICWALL and the WS for indexing clients.
    b. "eventId"—Describes the logoff request event.
3. The SONICWALL sends a result to the WS in the same connection. Results are described in the Message Format—Logoff Reply section.
4. If the client returns from the idle state and attempts to reach a web resource, the SONICWALL redirects the user to the externalGuestRedirect.html page, starting the Session Creation process over.

WS server status check is to provide more granular ABE status than simple WS availability, the SONICWALL can optionally send, for example, a secure HTTP GET operation to the WS in order to determine server operational status. The target URL will be configurable, as will the interval of the query (e.g., between 1 and 60 minutes). The WS responds back in an XML format listing the server's current state. Refer to Message Format section for details.

If an error response code (e.g., 1, 2, or 255) is received (e.g., indicating that the WS itself is available, but that some other ABE error condition has occurred), the SONICWALL logs the response and redirects all subsequent authentication requests to an internal "wirelessServicesUnavailable.html" page. This page will provide administrator configurable text explaining recourse. The SONICWALL will continue to attempt to query the ABE at the configured interval and will resume redirection to the WS (rather than to the wirelessServicesUnavailable.html page) when a response code of 0 ('Server Up') is received.

At a configurable interval (e.g., between 1 and 60 minutes), the SONICWALL may optionally send, for example, a secure HTTP POST operation to the WS containing an XML list of some or all currently active guest sessions:

The feature itself will be enabled via a checkbox on the SONICWALL and will be disabled by default.

The target URL will be configurable.

The CGI post will provide the "sessionList" as an XML list of all active guest sessions.

Message authentication feature ensures that the CGI data exchanged between both the SONICWALL and ABE originated from the SONICWALL/ABE device, and that it has not been tampered with. If enabled, an additional CGI parameter named "hmac" will be added to all CGI data exchanged. The following is an example of what the redirect URL now looks like with message authentication enabled:

https://10.1.2.3/login.asp?sessionId=
faad7f12ac26d5c2fe3236de2c149a22&ip=
172.16.31.2&mac=00:90:4b:6a:37:
32&ufi=0006B1020148&mgmtBaseUrl=https://
10.0.61.222:4043/&clientRedirectUrl=http://
192.168.168.168:80/&req=http://www.google.
com/&hmac=cd2399aeff26d5c2fe3236d211549acc In the above-example, the HMAC signature was generated using the following data structure:

HMAC(
faad7f12ac26d5c2fe3236de2c149a22+
172.16.31.2+
00:90:4b:6a:37:32+
0006B1020148+
https://10.0.61.222:4043/+
https://10.0.61.222:4043/+
http://www.google.com/

If message authentication is enabled then the SONICWALL device will expect an HMAC signature as part of the CGI post data originating from the ABE. If the SONICWALL detects that the HMAC is missing or incorrect, then an error code of 251 is returned, and the requested operation (e.g. guest login, account creation, etc) is aborted.

In one embodiment, an external authentication request may be sent via a secure HTTP POST operation, where the POST parameters may include the following:

sessId: Session ID
userName: The full user ID
sessionLifetime: The session lifetime of the user (in seconds)
idleTimeout: The max idle timeout (in seconds)

In one embodiment, in response to the external authentication request set forth above, an external authentication response may be an XML (extensible markup language) response, similar to those shown in FIG. 10A, where the (response code) includes, but is not limited to, one of the values listed in the following table:

| Response Code | Response Meaning |
|---|---|
| 50 | Login succeeded |
| 51 | Session limit exceeded |
| 100 | Login failed -- access reject |
| 251 | Msg. Auth failed -- Invalid HMAC |
| 253 | Invalid session ID |
| 254 | Invalid or missing CGI parameter |
| 255 | Internal error |

In one embodiment, a local authentication request may be sent via a secure HTTP POST operation, where the POST parameters may include the following:

sessId: Session ID
userName: The full user ID
passwd: The guest's clear-text password In one embodiment, in response to the local authentication request set forth above, a local authentication response may be an XML (extensible markup language) response, similar to those shown in FIG. 10A, where the (response code) includes, but is not limited to, one of the values listed in the following table:

| Response Code | Response Meaning |
|---|---|
| 50 | Login succeeded |
| 51 | Session limit exceeded |
| 52 | Invalid username/password |
| 100 | Login failed -- access reject |
| 251 | Msg. Auth failed -- Invalid HMAC |
| 253 | Invalid session ID |
| 254 | Invalid or missing CGI parameter |
| 255 | Internal error |

In one embodiment, a logoff request may be sent via a secure HTTP POST operation, where the POST parameters may include the following:

sessId: GW Session ID
eventId: Logoff event ID may be one of the following:

| Logoff Event ID | Event Meaning |
|---|---|
| 1 | Guest logged out manually |
| 2 | Admin logged off the specified guest |
| 3 | Guest session expired |
| 4 | Guest idle timeout expired |

In one embodiment, in response to the logoff request set forth above, a logoff response may be an XML (extensible markup language) response, similar to those shown in FIG. 10B, where the (response code) includes, but is not limited to, one of the values listed in the following table:

| Response Code | Response Meaning |
|---|---|
| 150 | Logoff succeeded |
| 251 | Msg. Auth failed -- Invalid HMAC |
| 253 | Invalid session ID |
| 254 | Invalid or missing CGI parameter |
| 255 | Internal error |

In one embodiment, in response to a WS server status check, a response may be returned in an XML response, similar to the one shown in FIG. 10C, where the {response code} includes, but is not limited to, one of the values listed in the following table:

| Response Code | Response Meaning |
|---|---|
| 0 | Server Up |
| 1 | DB down |
| 2 | Configuration error |
| 255 | Internal error |

Periodically, a gateway device may send session state synchronization request via a secure HTTP POST operation to the AS containing an XML list of all currently active guest sessions similar to the one shown in FIG. 10D. Both the target URL and time period will be configurable by the GW admin. The CGI post parameters includes the following argument:

sessionList: XML list of all active GW guest sessions.

In response, according to one embodiment, an XML response may be returned similar to the one shown in FIG. 10E, where the response code may be one of the values listed in the following table:

| Response Code | Response Meaning |
| --- | --- |
| 200 | Sync successful |
| 201 | Sync failed |
| 255 | Internal error |

In one embodiment, a WS sends local account creation request via a secure HTTP POST operation, where the POST parameters include, but is not limited to, the following arguments:

userName: The full user id (max length: 32)
passwd: The guest's clear-text password (max length: 64)
comment: Optional (max length: 16). Default=NULL
enforceUniqueLogin: Optional: 1=true, 0=false. Default=1
activateNow: Optional: 1=true, 0=false. Default=0
autoPrune: Optional: 1=true, 0=false. Default=1
accountLifetime: The account lifetime of the user (expressed in seconds)
sessionLifetime: The session lifetime of the user (expressed in seconds)
idleTimeout: The max idle timeout (expressed in seconds)

In response, a local account creation reply may be returned in an XML format, similar to the one shown in FIG. 10F, where the (response code) may include, but is not limited to, one of the values listed in the following table:

| Response Code | Response Meaning |
| --- | --- |
| 10 | Account creation succeeded |
| 11 | Max account limit |
| 12 | Account Exists |
| 251 | Msg. Auth failed -- Invalid HMAC |
| 254 | Invalid or missing CGI parameter |
| 255 | Internal error |

Figure 11:
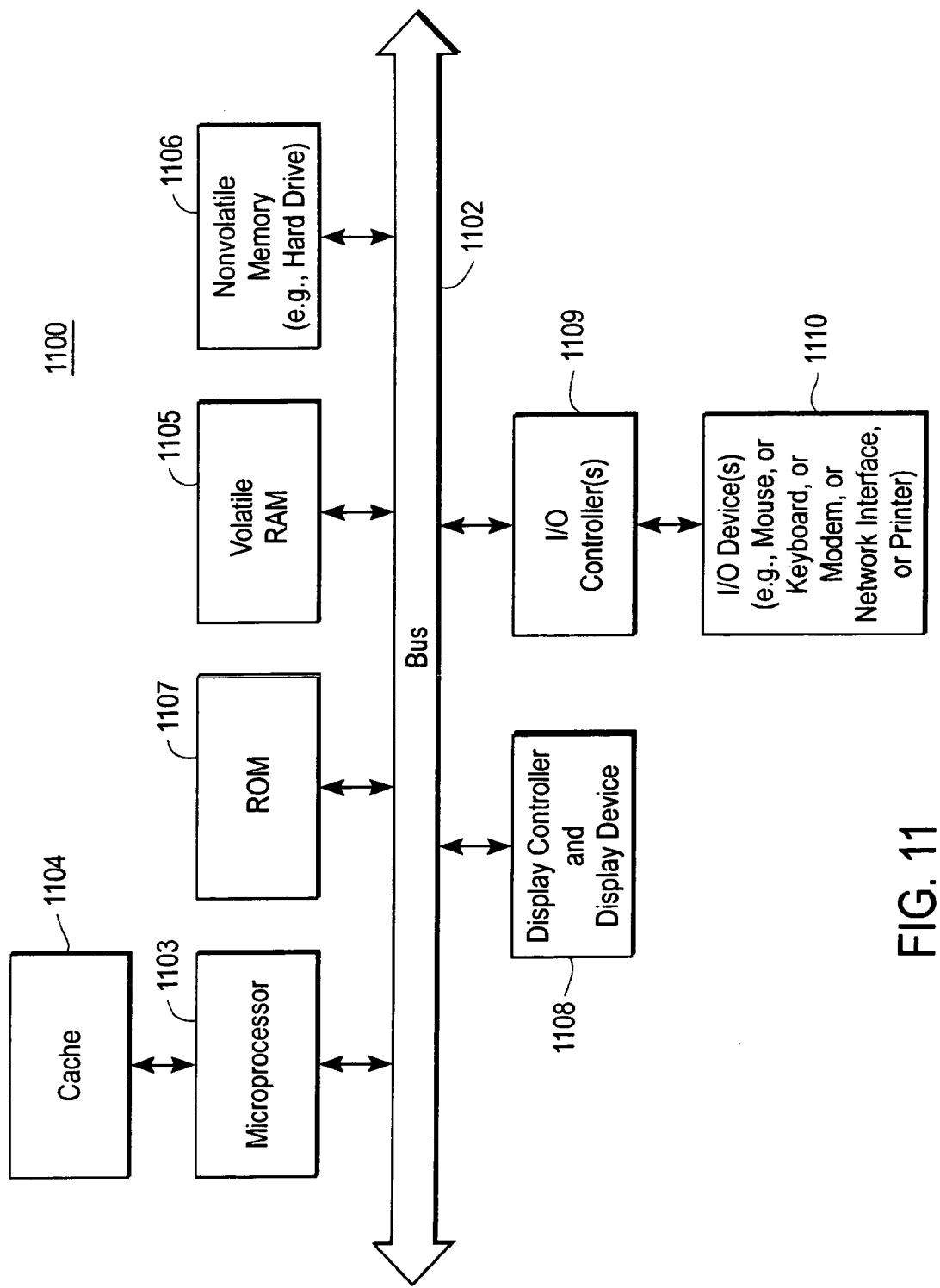
FIG. 11 is a block diagram of a digital processing system which may be used with one embodiment of the invention.

FIG. 11 is a block diagram of a digital processing system which may be used with one embodiment of the invention. For example, the system 1100 shown in FIG. 11 may be used as a client computer system (108A-108N of FIG. 1A). Alternatively, the exemplary system 1100 may be implemented as a network access device described above and/or a wireless access point. Further, the exemplary computer system 1100 may be implemented as an update device described above.

Note, that while FIG. 11 illustrates various components of a computer system, it is not intended to represent any particular architecture or manner of interconnecting the components, as such details are not germane to the present invention. It will also be appreciated that network computers, handheld computers, cell phones, and other data processing systems which have fewer components or perhaps more components may also be used with the present invention.

As shown in FIG. 11, the computer system 1100, which is a form of a data processing system, includes a bus 1102 which is coupled to a microprocessor 1103 and a ROM 11011, a volatile RAM 1105, and a non-volatile memory 1106. The microprocessor 1103, which may be, for example, a PowerPC G4 or PowerPC G5 microprocessor from Motorola, Inc. or IBM, is coupled to cache memory 1104 as shown in the example of FIG. 11. The bus 1102 interconnects these various components together and also interconnects these components 1103, 11011, 1105, and 1106 to a display controller and display device 1108, as well as to input/output (I/O) devices 1110, which may be mice, keyboards, modems, network interfaces, printers, and other devices which are well-known in the art.

Typically, the input/output devices 1110 are coupled to the system through input/output controllers 1109. The volatile RAM 1105 is typically implemented as dynamic RAM (DRAM) which requires power continuously in order to refresh or maintain the data in the memory. The non-volatile memory 1106 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 11 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 1102 may include one or more buses connected to each other through various bridges, controllers, and/or adapters, as is well-known in the art. In one embodiment, the I/O controller 1109 includes a USB (Universal Serial Bus) adapter for controlling USB peripherals. Alternatively, I/O controller 1109 may include an IEEE-1394 adapter, also known as FireWire adapter, for controlling FireWire devices. Other components may also be included.

Thus, authentication mark-up data of multiple local area networks (LANS) has been described herein. It will be appreciated that some or all of the operations described above, for example, operations involved in FIGS. 2-5, 7-8, and 9A-9B, may be performed by processing logic that may include hardware (e.g., circuitry, dedicated logic, etc.), software (such as is run on a general-purpose computer system, a server, a router, or a dedicated machine), or a combination of both.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, the present invention is not described with reference to any particular programming language. It will be appreciated that a variety of programming languages may be used to implement the teachings of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, the embodiments have been described with reference to specific exemplary embodiments thereof. It will be evident that various modifications may be made thereto without departing from the broader spirit and scope of the embodiments as set forth in the following claims. For example, in some embodiments, the concepts disclosed herein may be applied to other networking standards and protocols consistent with this disclosure which are similar to, but not explicitly confined to the internet protocol disclosed herein. The specification and drawings are, accordingly, to be regarded in an illustrative sense rather than a restrictive sense.

What is claimed is:

1. A system, comprising:
    an update device coupled to a wide area network and having stored therein authentication markup data; and
    a plurality of network access devices (NADs) coupled to the wide area network, each of the NADs associated with a separate local area network (LAN), and each of the NADs to redirect clients attempting access through the NAD to an authentication page constructed using authentication markup data in the update device, wherein at least a portion of the authentication markup data stored in the update device is shared to construct authentication pages of at least two of the NADs, wherein the authentication markup data used to construct the authentication page is selected based on predetermined criteria of a respective LAN and a respective NAD, and wherein a first NAD of the plurality of NADs periodically requests operational status of the device and informs said operational status to other NADs of the plurality of NADs.

2. The system of claim 1, wherein the authentication page is the same for at least some of the plurality of NADs.

3. The system of claim 1, wherein an authentication page of a NAD is generated using at least a portion of the authentication markup data stored in the update device and is cached within the NAD when presented to the client over the respective LAN.

4. The system of claim 1, wherein at least one of the NADs performs at least a portion of the authentication.

5. The system of claim 1, wherein authentication is performed in at least one of an external authentication server and an internal authentication server.

6. The system of claim 1, wherein the authentication page is transmitted to each of the NADs from the update device, and stored locally in each of the plurality of NADs.

7. The system of claim 1, wherein a secure connection is formed between at least one of the NADs and the update device using at least one of a virtual private network protocol (VPN), a hypertext transport protocol secure socket layer protocol (HTTPS), an encryption method over a communications channel, a fully qualified domain name protocol (FQDN), and at least one internet protocol (IP) address.

8. The system of claim 1, wherein a list of at least one defined internet protocol (IP) address and at least one port name is maintained on each of the plurality of NADs to specify permitted communication channels between the plurality of NADs and the update device.

9. A machine implemented method, comprising:
    in response to a request for accessing a destination received from a client over a first local area network (LAN), a first network access device (NAD) establishing a first authentication page, which is constructed using authentication markup data stored in an update device communicatively coupled to the first NAD over a wide area network (WAN), wherein the authentication markup data used to construct the first authentication page is selected based on predetermined criteria of the first LAN and the first NAD, and wherein first NAD of the plurality of NADs periodically requests operational status of the update device and informs said operational status to other NADs of the plurality of NADs; and
    the first NAD redirecting the request of the client to the established first authentication page for authenticating the client, wherein at least a portion of the authentication markup data used in the first authentication page is shared with another authentication page established by a second NAD for authenticating a client of another LAN.

10. The method of claim 9, wherein at least a portion of the first authentication page is cached within the first NAD.

11. The method of claim 9, wherein the first NAD performs a portion of the authentication of the client using a user database maintained within the first NAD.

12. The method of claim 9, wherein the authentication is performed via at least one of an external authentication server and an internal authentication server with respect to at least one of the first NAD and the update device.

13. The method of claim 9, further comprising forming a secure connection between the update device and the first NAD using at least one of a virtual private network protocol (VPN), a hypertext transport protocol secure socket layer protocol (HTTPS), an encryption method over a communications channel, a fully qualified domain name protocol (FQDN), and at least one internet protocol (IP) address.

14. The method of claim 9, further comprising maintaining a list of at least one defined Internet protocol (IP) address and at least one port identity within the first NAD to specify permitted communications channels between the first NAD and the update device.

15. The method of claim 9, further comprising the update device transmitting the first authentication page to the first NAD to authenticate the client.

16. The method of claim 15, further comprising the first authentication page invoking an authentication facility to authenticate the client in response to a user input received via the first authentication page.

17. The method of claim 16, further comprising:
determining status of the authentication facility while presenting the first authentication page to the client; and
presenting a second authentication page to the client indicating authentication service unavailable if the authentication facility is unavailable based on the status of the authentication facility, wherein the second authentication page is constructed using at least a portion of the authentication markup data stored in the update device.

18. The method of claim 16, further comprising:
in response to authentication information received from the client, the authentication facility authenticating the client; and
presenting a third authentication page to the client indicating a failure of the authentication if the authentication fails and redirecting the client back to the first authentication page, wherein the third authentication page is constructed using at least a portion of the authentication markup data stored in the update device.

19. The method of claim 18 further comprising the first NAD directing the client to the requested destination if the authentication facility successfully authenticates the client.

20. A machine implemented method, comprising:
centralizing control of markup data for generating authentication pages by, storing the markup data in an update device accessible over a wide area network (WAN); and
operating a plurality of gateway in different local area networks (LANs) coupled to the WAN to cause redirection of clients attempting access through the plurality of gateway devices to authentication pages constructed using the markup data in the update device, wherein the authentication markup data used to construct the authentication pages is selected based on predetermined criteria of respective LANs and respective plurality of gateway devices, and wherein a first gateway device of the plurality of gateway devices periodically requests operational status of the update device and informs said operational status to other gateway devices of the plurality of gateway devices.

21. The method of claim 20, wherein the markup data is stored in storage accessible by the update device, and wherein the markup data is configured by an administrator by accessing the update device.

22. The method of claim 20, further comprising invoking an authentication server to authenticate the clients in response to user inputs received via the authentication pages.

23. The method of claim 22, wherein the authentication pages are constructed by the update device using the markup data stored therein, wherein at least one of the authentication pages is transmitted to each of the plurality of gateway devices and hosted by a respective gateway device, and wherein the respective gateway device invokes the authentication server to authenticate the clients.

24. The method of claim 20, wherein the authentication pages are constructed by the update device using the markup data stored therein and hosted by the update device, and wherein the update device invokes the authentication server to authenticate the clients.

* * * * *